United States Patent [19]

Wheeler

[11] Patent Number: 4,479,292
[45] Date of Patent: Oct. 30, 1984

[54] POLYGON BOX TOOLS APPLIED TO AUTOMATIC SCREW MACHINES

[75] Inventor: Harold E. Wheeler, Athens, Pa.

[73] Assignee: Wheeler Tool Company, Athens, Pa.

[21] Appl. No.: 426,342

[22] Filed: Sep. 29, 1982

[51] Int. Cl.³ .............................................. B23B 3/28
[52] U.S. Cl. ........................................ 29/56; 29/57; 82/18; 82/19
[58] Field of Search ................ 82/19, 1.3, 18; 29/56, 29/57

[56] References Cited

U.S. PATENT DOCUMENTS

| 1,918,331 | 7/1933 | Groene et al. | 82/19 |
| 2,369,318 | 2/1945 | Sirp et al. | 29/56 |
| 2,912,892 | 11/1959 | Hoeln | 82/19 X |
| 3,742,792 | 7/1973 | Willen | 29/57 X |
| 3,744,355 | 7/1973 | Flisch | 82/19 X |
| 3,750,498 | 8/1973 | Willen | 29/57 X |
| 3,771,391 | 11/1973 | Jacks | 82/19 |
| 3,813,969 | 6/1974 | Wheeler | 82/19 |

FOREIGN PATENT DOCUMENTS 0136007 6/1979 German Democratic Rep. .... 82/19

Primary Examiner—William R. Briggs
Assistant Examiner—Glenn L. Webb
Attorney, Agent, or Firm—Edwin E. Greigg

[57] ABSTRACT

A polygon box tool for use with different machine tools by which a cutting and boring operation may be performed simultaneously. The polygon box tool may be used for turning a hexagon shape on the outside diameter of the workpiece while simultaneously turning flats on a smaller diameter in front of the hexagon contour.

1 Claim, 6 Drawing Figures

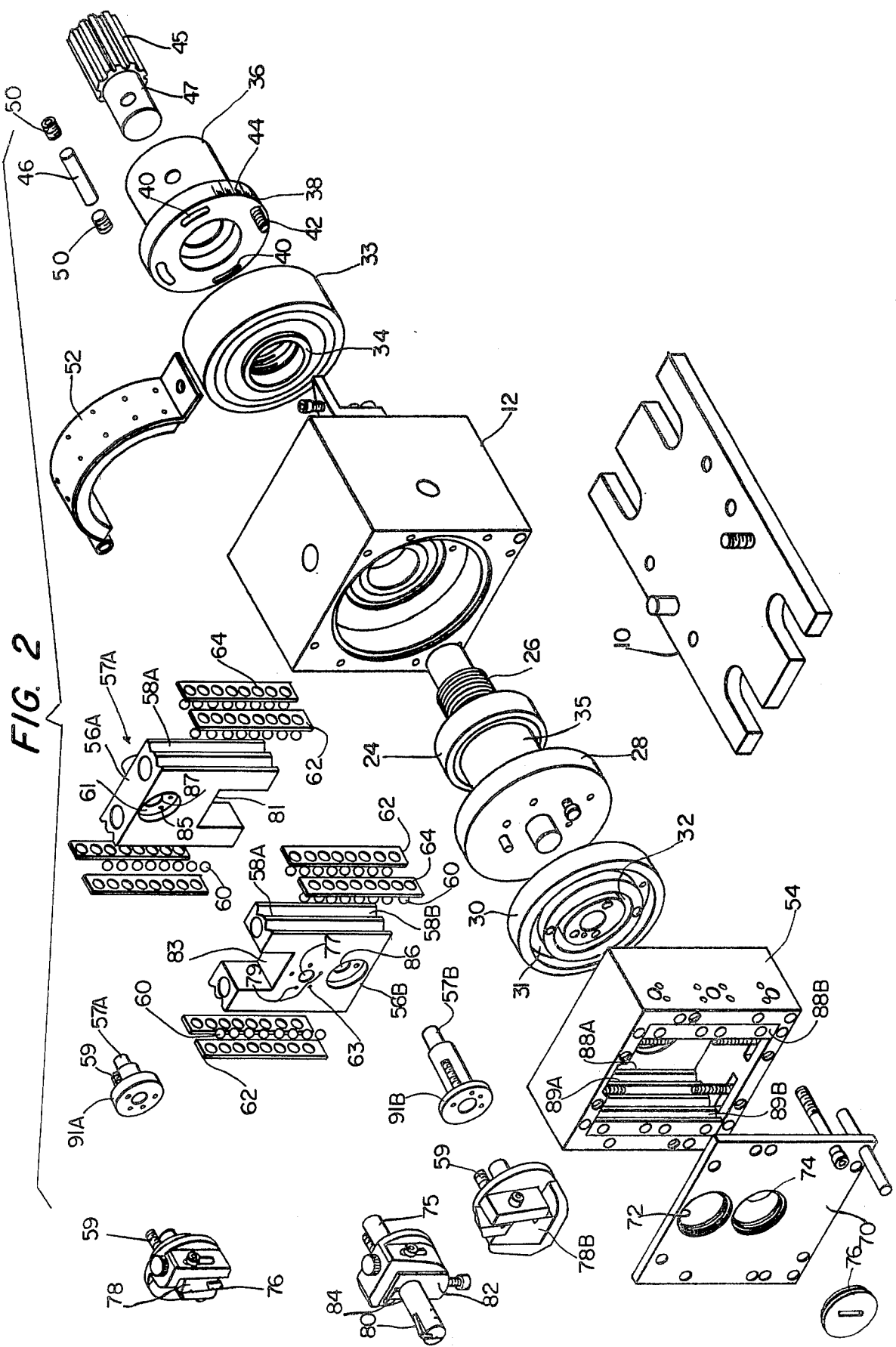

POLYGON BOX TOOLS APPLIED TO AUTOMATIC SCREW MACHINES

RELATIONSHIP TO OTHER CASES

This application relates to a companion application, Ser. No. 426,343, filed on the same date, which is incorporated herein by reference.

BACKGROUND OF THE INVENTION

This invention is directed to polygon box tools and more particularly to a polygon box tool which may be used for simultaneous boring and turning operations for the purpose of shaping a work piece on the outside and inside simultaneously, or turning two different contours outside simultaneously.

This invention pertains to a cam operated polygon box tool in which the cam has two grooves in the cam face for simultaneously controlling two different tools. The device may produce multi-sided configured surfaces on the outside and inside of the work piece so that the work piece is finished in one operation.

It is well known that many parts used in industry are made of bar stock and turned to shape and size before cutting off in an Automatic Screw Machine. This is done because these machines have 4-6 or 8 spindles and may be performing the operations of drilling, tapping, reaming, turning, forming, etc. simultaneously thus producing work pieces at low cost.

Very often these parts need additional milling or contouring operations to complete the work piece and this is done as a secondary operation, such as milling a flat, etc. on a conventional milling machine. This secondary operation often takes more time than the first Automatic Screw Machine operation and is expensive.

Some attempts to finish the work pieces complete on the Automatic Screw Machines by using Polygon Box Tools to turn flats, contours, etc. have been made. These tools such as described in U.S. Pat. No. 3,813,969 have been made with heavy reciprocating parts and the whole operation has been slowed to the speed at which the Polygon Box Tools would operate.

The results have been fewer parts completely machined, thus showing little overall savings. This invention is an improvement over U.S. Pat. No. 3,813,969 and overcomes the drawbacks found in the patented device and which permits operation of the polygon box tool at the desired speed of the driving machine such as a screw machine.

Additionally, polygon box tools have been provided in which the cam used to actuate the reciprocating parts has been a simple cam including two separate grooves for receipt of two separate cam follower pins.

SUMMARY OF THE INVENTION

This invention sets forth a polygon box tool which will operate at the desired speed of the driving machine and uses a grooved face cam which enables one to turn or bore different contours of a finished product by use of a screw machine for driving the polygon box tool.

In the new device reciprocating parts are actuated outwardly and inwardly by a grooved face cam, giving positive control of cutting tools at high speed. Also, the new Polygon Box Tool with the reciprocating parts is much smaller and lighter than the prior art devices and can operate at a much higher speed. The new Polygon Box Tool will operate as fast as the regular set up, and milling and contouring operations are added to the other operations, resulting in a finished work piece at no increase in cost over the regular automatic time of one operation.

The new Polygon Box Tool has been developed for high speed operation and uses a transverse slide weighing about 5 oz. compared to prior art devices which weighed about 40 oz. In addition to a reduction in weight, the cam has a grooved face which allows increased speed. This has resulted in an increase in the operating speed from about 250 r.p.m. up to about 2000 r.p.m. which enables an Automatic Screw Machine operator to perform the contouring or boring operations without slowing the usual cycle time.

It is therefore an object of this invention to provide a polygon box tool which makes use of parts which permits operation at the desired speed of the driving machine.

Another object is to make a grooved face cam which is of well rounded development and extremely hard to resist the wear as required to operate turning and boring tools at desired speeds of the driving machine to carry out the turning and boring operation.

BRIEF DESCRIPTION OF THE DRAWINGS

FIG. 2 is an exploded perspective view more clearly showing the relative parts of the device.

DETAILED DESCRIPTION OF THE INVENTION

Figure 3:
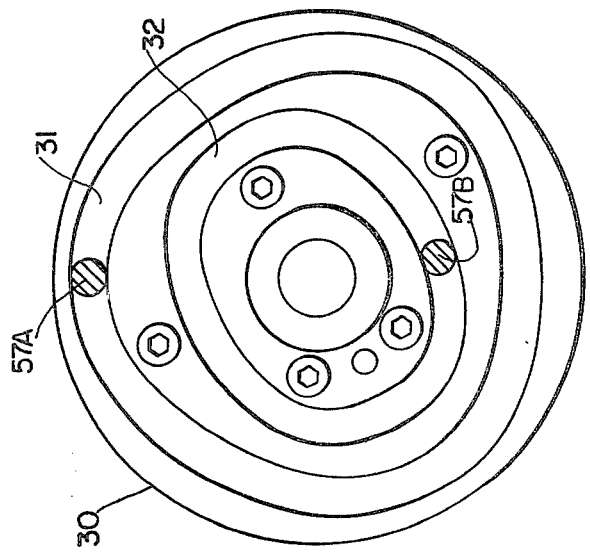
FIG. 3 illustrates a two groove cam such as used in the device, FIG. 1.
Figure 4:
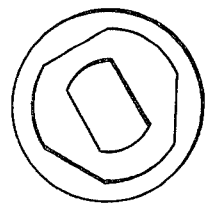
FIGS. 4-6 illustrate sample work pieces made with a device with the transverse slides reciprocating along a vertical line.
Figure 6:
Figure 5:
Figure 1:
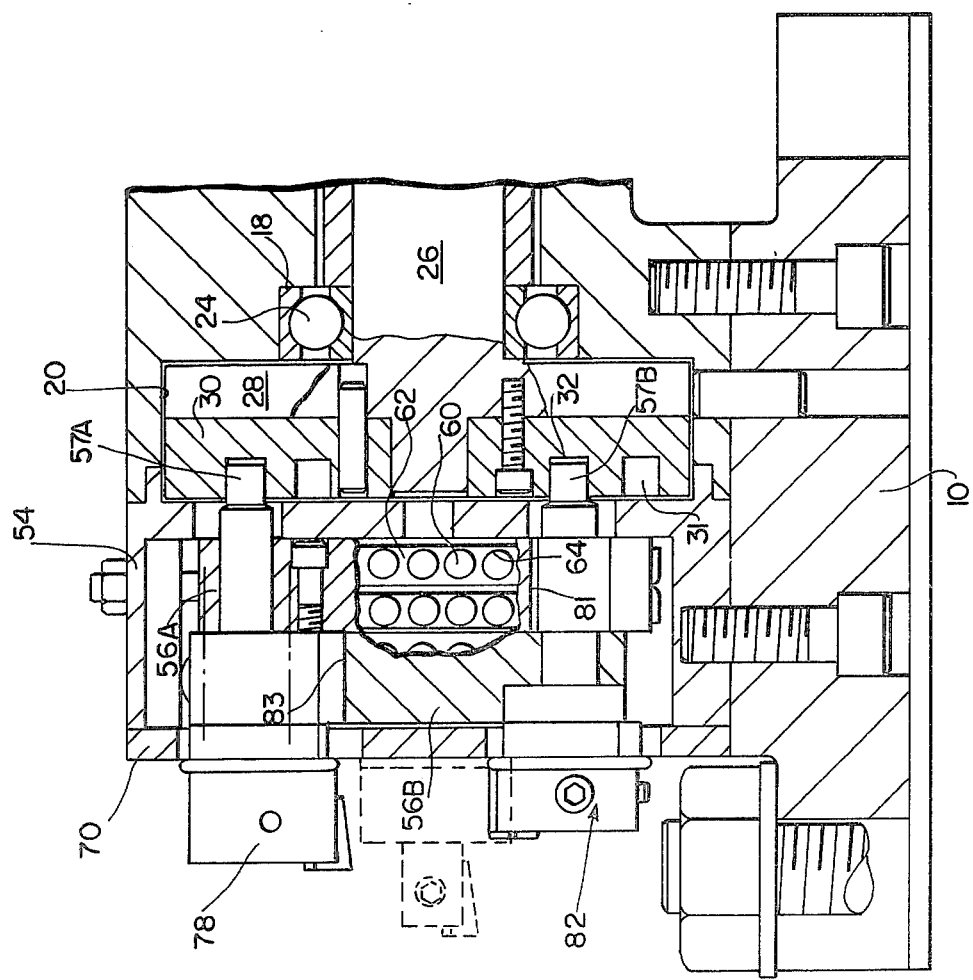
FIG. 1 is a cross sectional view of the polygon box tool.

Now referring to the drawing there is shown a polygon box tool which is driven by any suitable drive means such as shown and described in patent application Ser. No. 426,343 filed on even date. The device shown herein includes a base 10 which is thicker than shown in the companion patent application because mounting plates are furnished in various thicknesses and shapes to suit different machines. The housing 12 supports the cam shaft 26 which is rotated in bearings 24 (one of which is shown) by any suitable drive mechanism such as shown in the companion application. The cam shaft includes an enlarged integral cylindrical end 28 to which is secured a cam 30. The cam face includes two grooves 31 and 32 in its face as shown in FIG. 3. The housing is provided with different diameter shoulders 18 and 20 which supports the bearing 24 and which provides an enclosure for the cam shaft end 28 and the cam 30.

The front housing 54 is sufficiently thick that it can accommodate two transverse slides 56A and 56B. Each transverse slide is provided with V-grooved side faces 58A and 58B which receive ball bearings 60 therein. The ball bearings are held in place by use of plates 62 each of which includes a plurality of holes 64 therein, one hole for each ball bearing. The balls are secured between the transverse slide V-grooves 58 and other groove rails 89 by using screws 90 to preload bearing assembly. The transverse slides and V-groove rails are mounted in the front housing 54 for reciprocating motion along a vertical line. The preloading allows reciprocation with minimum deflection. The transverse slide 56A closest to the cam is provided with a cam follower pin 57A which is secured thereto and extends into the outer groove 31 in the face of the cam. The transverse slide 56A is provided with a cutout on its center line from the bottom toward the center so that the cam follower pin 57B on transverse slide 56B can extend through the cutout in the inner transverse slide 56A into the groove 32 in the cam face. The transverse slide 56B is provided with a cutout on its center line from the upper edge toward the center so that the cutter tool holer 78 can extend through the cutout and be secured to the transverse slide 56A opposite the cam follower pin 57A. The boring tool holder 82 is secured to the outermost transverse slide in the center hole area. It is positioned in the transverse slide by a dowel which fits into hole 63. The boring bar is positioned by use of the centering pin 84. The cam follower pin 57B is located in the lower hole 86 extending through the cutout 81 in the inner transverse slide and extends into the innermost groove 32 in the cam face. A cover plate 70 encloses the double transverse slides in the front housing 54. Of course the front cover plate is provided with appropriately placed openings through which the working tool holders extend in order to secure the tool holders to their respective transverse slide.

The transverse slides are provided with appropriate extension springs on each side of center which are provided to overcome the rotational torque of the cutting tools during operation.

FIG. 3 ilustrates a two-groove cam 30 such as used in the device set forth above for two transverse slides. The uppermost working tool 78A is controlled by the cam follower pin 57A that rides in the outermost groove 31. The centermost working tool 82 is controlled by the cam follower pin 57B that rides in the innermost groove 32. The arrangement of parts in this device permits operation of both working tools simultaneously. The upper tool will follow the path as outlined by the outermost cam groove and the centrally located working tool which is used for boring operations only will follow the path as outlined by the innermost cam groove, after removing the boring tool. The lower tool 78B and upper tool 78A are used for turning two different shapes and sizes with the lower tool following the path outlined by the innermost cam groove. In carrying out the operation of the device, the polygon box tool will be assembled with the desired two-groove cam for shaping the inner and outer surface of a workpiece or two different shape and size outside contours.

For a combination of boring and turning operations the boring tool 82 will be secured to the transverse slide 56B in the centrally located hole 77 and the proper turning tool 78A will be secured to transverse slide 56A in the uppermost hole 87. Cam follower pin 57A which is secured to transverse slide 56A extends into the cam 30 in groove 31. Cam follower pin 57B is secured to transverse slide in the lower position in hole 86 with cam follower pin extending through cutout 81 with pin 57B extending into cam 30 innermost groove 32. When turning two different shapes and size contours the boring tool 82 is removed and the proper turning tool 78B is secured to the front transverse slide in the lower position using hole 86. The proper cutting tool will be secured to the transverse slides and the pieces to be worked will be secured within a chuck or work piece holder and the working tools and material piece will be in alignment. The driving means is made operational and the cam shaft driving the cam will reciprocate the transverse slides 56A and 56B as the drive means operates. The chuck holding the work piece is rotated in synchronism at the same rotational speed as the double grooved cam in the polygon box tool. Each of the cutting tools will be separately and simultaneously reciprocated along a vertical line as the cam is rotated and the transverse slides are reciprocated by the cam follower pins.

Each of the transverse slides is designed for light weight reduction so that a combination of the light weight construction and the ball bearings which permits easy movement, allows operation of the cam driven transverse slides at the desired rotational speed of the driving means such as a screw machine. Even though there are two transverse slides to operate, the polygon box tool permits operation at the desired speed of the driving means. Since both cutting tools are operated simultaneously the work piece will be worked by each cutting tool simultaneously. Thus, an inner and outer desired configuration may be accomplished at the same time, or two different shape and size outside contours may be accomplished at the same time.

This device can be used to form two different contours—for example, bore a hexagonal hole in a work piece while turning flats on the outside; or turning a hexagon shape on the outside diameter of the work piece while turning flats on a smaller diameter in front of the hexagon contour. Other shapes can be made by use of different cams.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A polygon box tool comprising:
    a main housing,
    a cam shaft in said main housing which is driven by a drive means,
    a cam secured to said cam shaft,
    said cam including first and second grooves in one face of said cam, said first groove in said cam being formed in said cam at a greater radial dimension than said second groove in said cam face,
    a front housing,
    axially aligned first and second transverse slides in said front housing in parallel relationship with each other with said first and second cam grooves facing said transverse slides,
    a first cam follower pin extending from said first transverse slide and extending into said first cam groove for reciprocating said first transverse slide perpendicular to the axis of the tool,
    a second cam follower pin extending from said second transverse slide and extending through said first transverse slide into said second cam groove for reciprocating said second transverse slide,
    means for securing a first cutting tool on said first transverse slide for reciprocating movement therewith, and
    a second means for securing a second cutting tool on said second transverse slide for reciprocating movement therewith,
    whereby said first and second cutting tools perform work on a piece of material simultaneously.

* * * * *